US 9,959,018 B2

(12) United States Patent
Ryu et al.

(10) Patent No.: US 9,959,018 B2
(45) Date of Patent: May 1, 2018

(54) DISPLAY APPARATUS AND CONTROL METHOD THEREOF

(71) Applicant: SAMSUNG ELECTRONICS CO., LTD., Suwon-si (KR)

(72) Inventors: Young-jun Ryu, Suwon-si (KR); Byung-jin Hwang, Suwon-si (KR); Jae-hong Ahn, Yongin-si (KR); Dong-jin Lee, Suwon-si (KR); Hye-jeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1072 days.

(21) Appl. No.: 13/771,817

(22) Filed: Feb. 20, 2013

(65) Prior Publication Data

US 2013/0219283 A1 Aug. 22, 2013

(30) Foreign Application Priority Data

Feb. 20, 2012 (KR) ........................ 10-2012-0016868

(51) Int. Cl.
*G06F 3/0484* (2013.01)
*H04L 29/08* (2006.01)
*G06F 3/14* (2006.01)

(52) U.S. Cl.
CPC ............ *G06F 3/0484* (2013.01); *H04L 67/08* (2013.01); *G06F 3/1454* (2013.01)

(58) Field of Classification Search
CPC .... G06F 3/048; G06F 3/0486; G06F 3/04845; G06F 3/04886; G06F 3/1454; G06F 9/4445; H04N 1/0044
See application file for complete search history.

(56) References Cited

U.S. PATENT DOCUMENTS 5,825,336 A 10/1998 Fujita et al.
2006/0033952 A1 2/2006 Oba
(Continued)

FOREIGN PATENT DOCUMENTS

CN 1913683 A 2/2007
CN 101131627 A 2/2008
(Continued)

OTHER PUBLICATIONS

Communication dated Jan. 20, 2016, issued by the European Patent Office in counterpart European Application No. 13154147.6.
(Continued)

*Primary Examiner* — Jeffrey A Gaffin
*Assistant Examiner* — Mandrita Brahmachari
(74) *Attorney, Agent, or Firm* — Sughrue Mion, PLLC

(57) ABSTRACT

The display apparatus includes: a display device; an image processor which processes an image to display the image on the display device; a communication unit which communicates with at least one first external device in which content data are stored and at least one second external device in which an application is installed to process the content data; and a controller which controls the image processor to communicate with the first and second external devices and display a user interface (UI) image corresponding to the content data and the application on the display device, and controls the processing operation of the application with respect to the content data through the UI image.

18 Claims, 5 Drawing Sheets

(56) References Cited

U.S. PATENT DOCUMENTS

| | | | |
|---|---|---|---|
| 2006/0136828 A1* | 6/2006 | Asano | 715/733 |
| 2007/0035616 A1* | 2/2007 | Lee et al. | 348/14.16 |
| 2007/0041056 A1 | 2/2007 | Wakai et al. | |
| 2008/0049249 A1 | 2/2008 | Tomita | |
| 2008/0214239 A1* | 9/2008 | Hashimoto et al. | 455/557 |
| 2008/0316529 A1 | 12/2008 | Hamatani | |
| 2009/0074074 A1 | 3/2009 | Au et al. | |
| 2009/0125586 A1 | 5/2009 | Sato et al. | |
| 2009/0156251 A1 | 6/2009 | Cannistraro et al. | |
| 2009/0175561 A1* | 7/2009 | Lankswert | 382/305 |
| 2010/0164839 A1 | 7/2010 | Lyons et al. | |
| 2011/0009166 A1 | 1/2011 | Noh et al. | |
| 2011/0059769 A1 | 3/2011 | Brunolli | |
| 2011/0089576 A1 | 4/2011 | Choi et al. | |
| 2011/0099497 A1 | 4/2011 | Fok et al. | |
| 2011/0265119 A1* | 10/2011 | Jeong et al. | 725/38 |
| 2011/0268218 A1 | 11/2011 | Kang et al. | |
| 2011/0276911 A1* | 11/2011 | Choi | 715/769 |

FOREIGN PATENT DOCUMENTS

| | | |
|---|---|---|
| CN | 102057364 A | 5/2011 |
| CN | 102238281 A | 11/2011 |
| EP | 1 895 400 A2 | 3/2008 |
| EP | 2 060 975 A2 | 5/2009 |
| EP | 2 131 271 A1 | 12/2009 |
| EP | 2 151 978 A1 | 2/2010 |
| JP | 9-22339 A | 1/1997 |
| JP | 2003-244690 A | 8/2003 |
| JP | 2006-113647 A | 4/2006 |
| JP | 2006-172193 A | 6/2006 |
| JP | 2007-58332 A | 3/2007 |
| JP | 2009-4914 A | 1/2008 |
| JP | 2008-171099 A | 7/2008 |
| JP | 2009-122947 A | 6/2009 |
| JP | 2010-191495 A | 9/2010 |
| JP | 2011-524544 A | 9/2011 |
| KR | 10-2010-0080407 | 7/2010 |

OTHER PUBLICATIONS

Communication dated Apr. 10, 2014, issued by the European Patent Office in counterpart European Application No. 13154147.6.

Communication, dated May 27, 2013, issued by the European Patent Office in counterpart European Patent Application No. 13154147.6.

Communication, Issued by the European Patent Office, dated Aug. 21, 2014, in counterpart European application No. 13 154 147.6.

Communication dated Jan. 26, 2017 issued by State Intellectual Property Office of People's Republic of China in counterpart Chinese Application No. 201310053358.6.

Communication dated Jan. 4, 2017 issued by Japanese Intellectual Property Office in counterpart Japanese Patent Application No. 2013-029337.

Communication dated Sep. 19, 2017, issued by The State Intellectual Property Office of People's Republic of China in counterpart Chinese application No. 201310053358.6.

Communication from the State Intellectual Property Office of the People's Republic of China dated Jan. 17, 2018 in counterpart Chinese Patent Application No. 201310053358.6, 24 pages with translation.

Communication from the Korean Patent Office dated Feb. 19, 2018 in corresponding Korean Patent Application No. 10-2012-0016868, 12 pages with translation.

* cited by examiner

DISPLAY APPARATUS AND CONTROL METHOD THEREOF

CROSS-REFERENCE TO RELATED APPLICATION

This application claims priority from Korean Patent Application No. 10-2012-0016868, filed on Feb. 20, 2012 in the Korean Intellectual Property Office, the disclosure of which is incorporated herein by reference in its entirety.

BACKGROUND

1. Field

Apparatuses and methods consistent with exemplary embodiments relate to a display apparatus and a control method thereof displaying various types of images, and more particularly, to a display apparatus and a control method thereof which communicates with a plurality of external devices and relays the plurality of external devices.

2. Description of the Related Art

A display apparatus processes image signals or image data which are input from an external image supply source or stored in the display apparatus, and displays an image on a display unit based on the processed image signal and/or image data. A display apparatus which is available to general users includes a television (TV) or a monitor. Further, in consideration of special functions required by a user, such display apparatus has been developed into a portable multimedia player (PMP), a mobile phone, etc.

With the development of local area communication in wired and/or wireless manner, a plurality of electronic devices accesses one another to share various signals, information, and/or data. For example, in the case of editing a photo taken by a camera, the camera takes a photograph of a predetermined object, generates and stores a digital data file. Then, a computer main body receives the image data from the camera through a preset wired and/or wireless protocol, and executes a prestored editing application to edit and process the image data.

Accordingly, transmission and processing of data is executed between a device which stores the data and a device in which the data processing application has been installed.

SUMMARY

Exemplary embodiments may address at least the above problems and/or disadvantages and other disadvantages not described above.

According to an aspect of an exemplary embodiment, there is provided a display apparatus including: a display unit; an image processor which processes an image to display the image on the display unit; a communication unit which communicates with at least one first external device in which content data are stored and at least one second external device in which an application for processing the content data is stored; and a controller which controls the communication unit to communicate with the first and second external devices and display a user interface (UI) image corresponding to the content data and the application on the display unit, and controls the processing operation of the application with respect to the content data through the UI image.

The UI image may include a first UI image corresponding to the first external device and a second UI image corresponding to the second external device, and the controller may control the processing operation for the content data according to an interaction input between the first and second UI images.

The first UI image and the second UI image may correspond to UI images provided by the first and second external devices, respectively.

The first UI image may include a list of the content data stored in the first external device, and the second UI image may include an execution view of the application of the second external device, and the controller may control the processing operation of the application with respect to first content data from the list as the first content data are dragged and dropped to the execution view of the application.

The display unit may include a touch screen, and the interaction input between the first and second UI images may include a drag and drop through the touch screen.

The controller may control the first external device to transmit the content data to the second external device, and control the second external device to process the content data through the application executed by the section external device.

The controller may control the application of the second external device to be executed in the display apparatus, receive the content data from the first external device and process the content data through the application executed by the display apparatus.

The controller may receive a UI image corresponding to an execution view of the application of the second external device and receive a UI image corresponding to the content data from the first external device to process the content data through the application executed by the second external device.

The display apparatus may further include a user input unit, and the controller may control the processing operation of the application with respect to the content data based on a user's input through the user input unit.

The controller may designate at least one of the first external device, the second external device and the display apparatus to store in the designated place the content data processed by the application.

According to an aspect of an exemplary embodiment, there is provided a control method of a display apparatus including: communicating with at least one first external device storing content data therein and at least one second external device storing an application therein to process the content data and displaying a UI image corresponding to the content data and the application; receiving a command to process the content data by the application through the UI image; and controlling a processing operation of the application with respect to the content data based on the command.

The UI image may include a first UI image corresponding to the first external device and a second UI image corresponding to the second external device, and the controlling the processing operation of the application with respect to the content data may include controlling the processing operation of the content data according to an interaction input between the first and second UI images.

The first and second UI images may correspond to UI images provided by the first and second external devices, respectively.

The first UI image may include a list of the content data stored in the first external device and the second UI image may include an execution view of the application of the second external device, and the controlling the processing operation for the content data according to the interaction input may include controlling the processing operation of the application with respect to the first content data by dragging and dropping the first content data of the list to the execution view of the application.

The display apparatus may include a touch screen, and the interaction input between the first and second UI images may include a drag and drop through the touch screen.

The controlling the processing operation of the application with respect to the content data may include controlling the first external device to transmit the content data to the second external device; and controlling the second external device to process the content data through the application executed by the second external device.

The controlling the processing operation of the application with respect to the content data may include executing the application of the second external device in the display apparatus; and receiving the content data from the first external device and processing the content data through the application executed in the display apparatus.

The displaying the UI image may include receiving a UI image corresponding to an execution view of the application of the second external device; and the controlling the processing operation of the application with respect to the content data may include receiving a UI image corresponding to the content data from the first external device and processing the content data through the application executed in the second external device.

The controlling the processing operation of the application with respect to the content data may include storing the content data processed by the application in at least one of the first external device, the second external device and the display apparatus as designated.

BRIEF DESCRIPTION OF THE DRAWINGS

The above and/or other aspects will become apparent by describing certain exemplary embodiments, with reference to the accompanying drawings, in which.

DETAILED DESCRIPTION OF EXEMPLARY EMBODIMENTS

Figure 1:
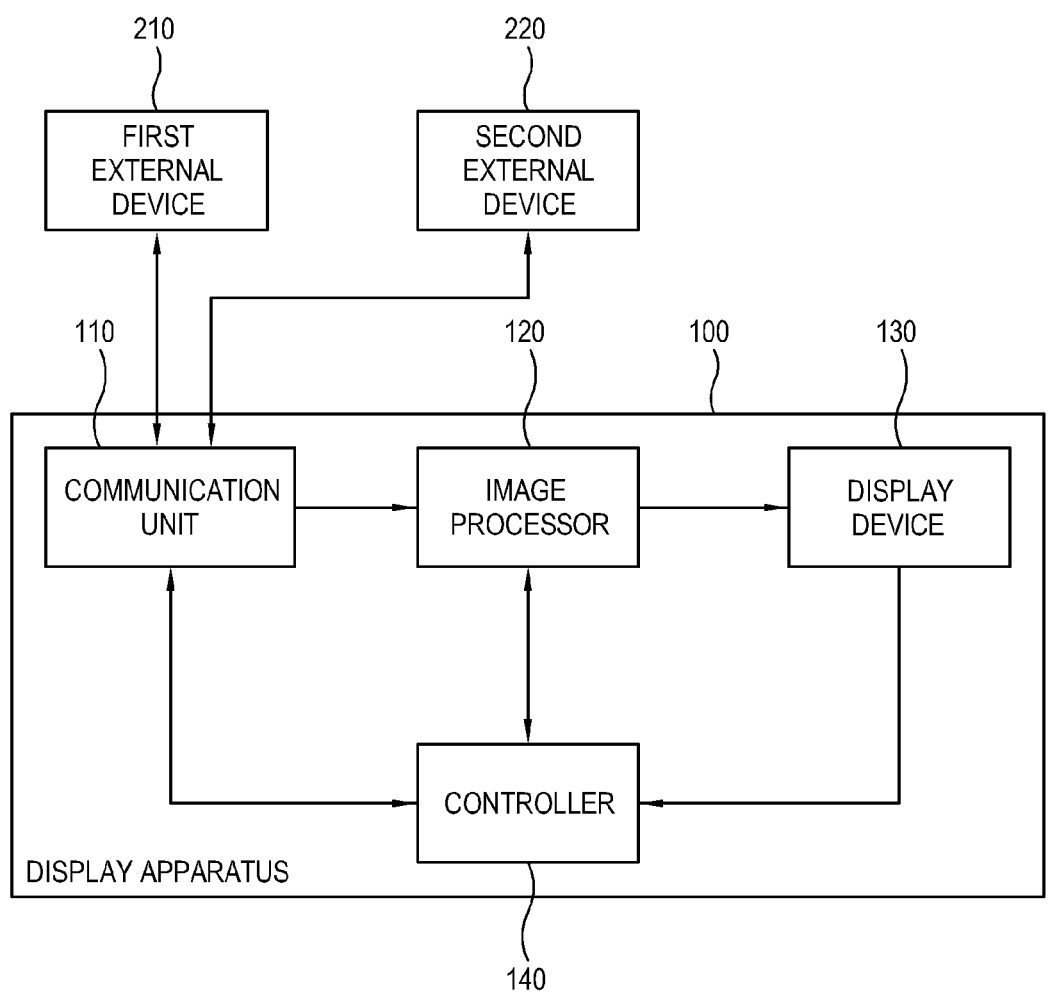
FIG. 1 is a block diagram of a display apparatus according to an exemplary embodiment.

Below, certain exemplary embodiments are described in greater detail with reference to accompanying drawings. The exemplary embodiments may be embodied in various forms without being limited to the exemplary embodiments set forth herein.

In the following description, like drawing reference numerals are used for the like elements, even in different drawings. The matters defined in the description, such as detailed construction and elements, are provided to assist in a comprehensive understanding of exemplary embodiments. However, exemplary embodiments can be carried out without those specifically defined matters. Also, well-known functions or constructions are not described in detail since that would obscure the invention with unnecessary detail.

FIG. 1 is a block diagram of a display apparatus 100 according to an exemplary embodiment.

As shown therein, a display system according to an exemplary embodiment includes a display apparatus 100 which displays an image, a first external device 210 and a second external device 220 which communicate with the display apparatus 100 and transmit and receive commands, data, information, and/or signals, the types of which are not limited.

The display apparatus 100 according to the present exemplary embodiment includes a multimedia player which is hand-held and portable. However, such embodiment of the display apparatus 100 is not limiting. In this regard, as long as the display apparatus 100 may display an image and communicate with the first and second external devices 210 and 220, the display apparatus 100 which may include a TV, a monitor, a mobile phone, etc.

The first and second external devices 210 and 220 include electronic devices which may store and/or process data. According to the present exemplary embodiment, the first external device 210 includes a digital camera and the second external device 220 includes a tablet PC. However, this is an example and the first and second external devices 210 and 220 may include a computer main body, a camera, a camcorder, a mobile phone and a TV as long as they may communicate with the display apparatus 100 based on a preset protocol.

Hereinafter, configuration of the display apparatus 100 will be described.

The display apparatus 100 includes a communication unit 110 which communicates with the first external device 210 or the second external device 220, an image processor 120 which processes data received through the communication unit 110 or stored in the display apparatus 100, a display device 130 which displays an image thereon based on the data processed by the image processor 120, and a controller 140 which controls overall operations of the display apparatus 100.

The communication unit 110 transmits commands, data, information, and/or signals from the first external device 210 or the second external device 220 to the image processor 120 or the controller 140 depending on the characteristic or nature of such commands, data, information, and signals. The communication unit 110 may transmit the commands, data, information, and signals supplied by the controller 150, to the first external device 210 or the second external device 220. As above, the communication unit 110 performs interactive communication with the first external device 210 or the second external device 220.

The communication unit 110 may directly access the first external device 210 or the second external device 220, or access a local area communication network to which both the first and second external devices 210 and 220 access. To do the foregoing, the communication unit 110 performs a communication access according to a preset wired and/or wireless communication protocol.

The image processor 120 processes data which are received through the communication unit 110 or data stored in advance in the display apparatus 100 to display an image on the display device 130. If the data include image data, the image processor 120 performs various processing operations. If the data include control information or script information instead of the image data, the image processor 120 processes the data information according to a preset algorithm to generate an image based on the data.

The image processor 120 may perform image processing operations including a decoding operation corresponding to an image format of an image signal, a de-interlacing operation to convert an interlace image signal into a progressive image signal, a scaling operation to scale an image signal into preset resolution, a noise reduction operation to improve an image quality, a detail enhancement operation and conversion of a frame refresh rate, but not limited thereto.

The image processor 120 includes a system-on-chip (SoC) which integrates various functions, or an image processing board (not shown) which is formed by installing individual elements independently performing various processes in a printed circuit board.

The display device 130 displays an image thereon based on image signals and/or image data output by the image processor 120. The display device 130 may include liquid crystal, plasma, light-emitting diode (LED), organic light-emitting diode (OLED), surface-conduction electron-emitter, carbon nano-tube, and nano-crystal, but not limited thereto.

The display device 130 may include additional elements depending on configuration thereof. For example, if the display device 130 includes liquid crystal, the display device 130 includes a liquid crystal display (LCD) panel (not shown), a backlight (not shown) to emit light to the LCD panel, and a panel driving substrate (not shown) to drive the LCD panel.

The display device 130 according to the present exemplary embodiment includes a touch screen. The display device 130 transmits a preset command and/or signal to the controller 140 corresponding to a user's touch input on the surface of the touch screen.

The controller 140 controls an operation of the display apparatus 100 or generates and transmits a corresponding control signal through the communication unit 110, corresponding to a command received through the communication unit 110 or an input command displayed on the display device 130. For example, the controller 140 may control an image processing operation of the image processor 120 or transmit a preset control signal to the first external device 210 or the second external device 220 to operate the first external device 210 or the second external device 220 by the control signal, according to the nature of the received command.

According to an exemplary embodiment, the controller 140 and the image processor 120 are described as separate elements, but not limited thereto. Alternatively, the controller 140 and the image processor 120 may be provided as a single image processing board (not shown).

With the foregoing configuration, a control method of the display apparatus 100 for processing content data stored in the first external device 210 by an application stored in the second external device 220 will be described hereinafter.

According an exemplary embodiment, editing and processing of an image data file stored in the first external device 210 is performed by an image editing application stored in the second external device 220. However, this is an example, and the nature of the data or application, or exemplary embodiment of a UI image is not limited thereto.

The controller 140 is connected to the first and second external devices 210 and 220 through the communication unit 110 for communication, and controls the image processor 120 to display an UI image of the first and second external devices 210 and 220, respectively, on the display device 130.

The method of realizing a UI image corresponding to the first and second external devices 210 and 220 by the controller 140 may vary.

For example, the controller 140 transmits a request signal to the first and second external devices 210 and 220 to generate a UI image. In response to the request signal received, the first and second external devices 210 and 220 transmit to the display apparatus 100 their own information necessary for generating the UI image. The controller 140 generates a UI image based on the information transmitted by the first and second external devices 210 and 220, respectively.

Figure 2:
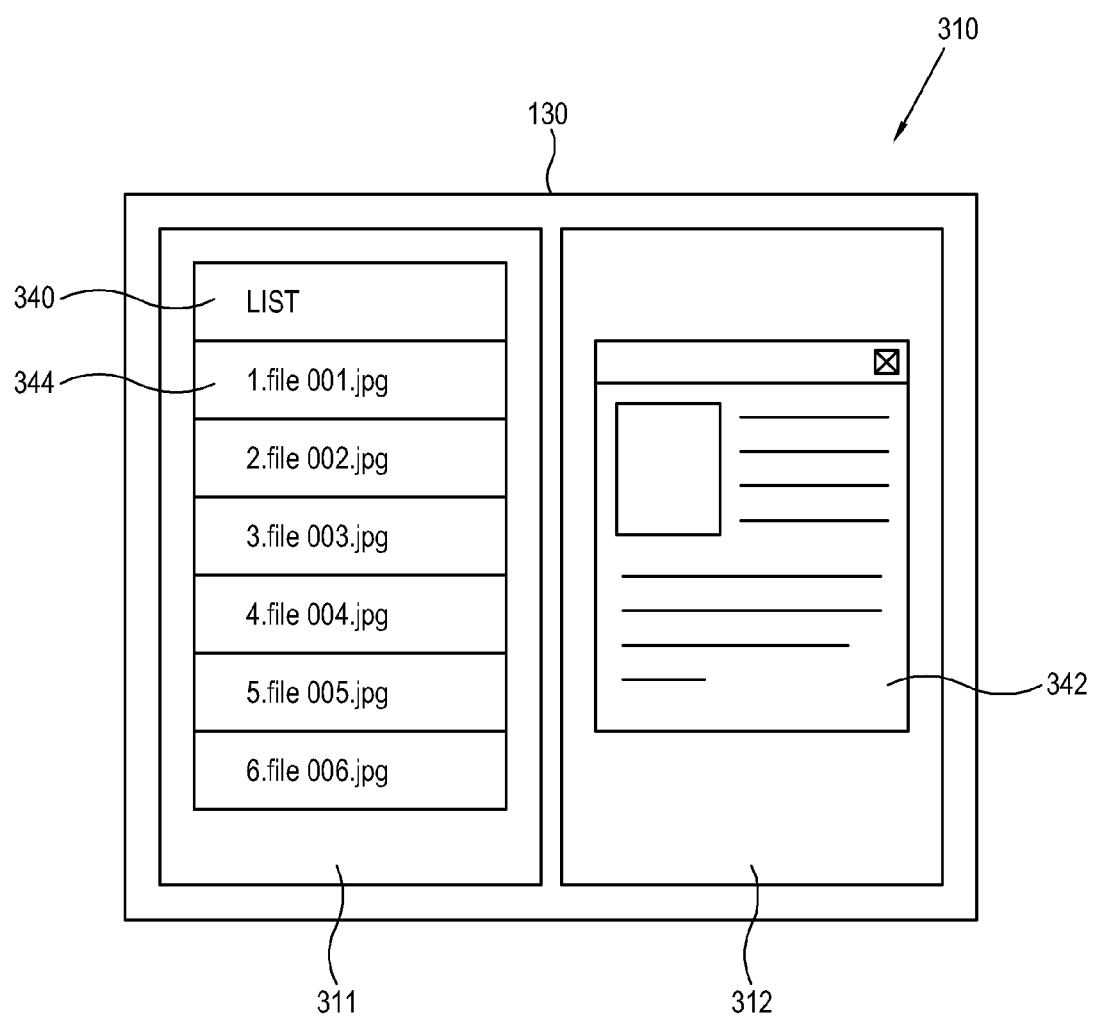
FIG. 2 illustrates an example of a UI image corresponding to a first external device and a second external device which are displayed in the display apparatus according to an exemplary embodiment.

FIG. 2 illustrates an example of a UI image 310 corresponding to the first and second external devices 210 and 220 displayed on the display device 130, respectively.

As shown therein, the controller 140 displays the UI image 310 on the display device 130 corresponding to the first and second external devices 210 and 220. The UI image 310 includes a first UI image 311 corresponding to the first external device 210, and a second UI image 312 corresponding to the second external device 220. The controller 140 may control operations of the first and second external devices 210 and 220 through the first and second UI images 311 and 312.

If the first and second external devices 210 and 220 provide information and/or image data corresponding to their own UI environment, the first and second UI images 311 and 312 may be formed to correspond to the UI environment information provided by the first and second external devices 210 and 220. For example, the first UI image 311 may reflect the UI environment provided by the first external device 210 itself.

With respect to the request signal transmitted by the controller 140, the first external device 210 transmits to the display apparatus 100 list information of prestored image data files, and the second external device 220 transmits to the display apparatus 100 the UI environment information on an operating system which can be used to drive the second external device 220.

Based on the foregoing information, the controller 140 displays both the first UI image 311 and the second UI image 312. The first UI image 311 includes an image data file list 340 of the first external device 210. The second UI image 312 includes an execution view 342 of an application which is executed in the operating system of the second external device 220.

The first and second UI images 311 and 312 are provided to enable interaction input therefrom, e.g., an input from the first and second UI images 311 and 312.

For example, a predetermined data file 344 in the list 340 of the first UI image 311 may be processed by an application of the second UI image 312. A user may touch, and drag and drop the data file 344 of the first UI image 311 in to the second UI image 312 to process the data file through the application.

In response to such operation, the controller 140 transmits a control signal to control the first external device 210 to transmit the data file to the second external device 220 and transmits a control signal to the second external device 220 to process the data file transmitted by the first external device 210 through the application, upon receiving an input to drag and drop the data file to the second UI image 312.

The first and second external devices 210 and 220 perform a corresponding operation according to the respective control signals. Then, the display apparatus 100 according to the present exemplary embodiment may relay the first and second external devices 210 and 220 to process the data file of the first external device 210 through the application of the second external device 220.

Upon receiving an input to manipulate a processing operation of the application through the second UI image 312, the controller 140 may transmit a control signal to the second external device 220 in response to the corresponding input, and control the second external device 220 to operate the application corresponding to the control signal. With respect to the operation of the application, real-time information may be provided by the second external device 220 to the display apparatus 100 and displayed on the second UI image 312.

If the processing of the data file by the application is completed, the controller 140 may designate at least one of the first external device 210, the second external device 220 and the display apparatus 100 to store therein the processed data file. To do the foregoing, the controller 140 transmits a corresponding control signal to the second external device 220.

Alternatively, the following method is available.

If communication is not available between the first and second external devices 210 and 220, or upon receiving an input for dragging and dropping a predetermined data file of the first UI image 311 to the second UI image 312 even in the case that such communication is available, the controller 140 may transmit the data file from the first external device 210 to the second external device 220.

If the system performance of the display apparatus 100 and the communication environment for the display apparatus 100 and the second external device 220 are ensured, the display apparatus 100 may perform at least a part of the processing operation of the data file performed by the application. In this case, when the application processes the data file in the second external device 220, the controller 140 provides system resources of the display apparatus 100 for processing the data file, or performs at least a part of such processing operation.

In the foregoing exemplary embodiment, a single first external device 210 and a single second external device 220 are described, but not limited thereto. Alternatively, each of the first external device 210 and the second external device 220 may include a plurality of devices. In this case, the UI image 310 may be divided into and displayed as a plurality of UI images corresponding to the first and second external devices 210 and 220, respectively, and may perform interaction therebetween. Details of such operation may be similar or equivalent to the described above exemplary embodiment, and thus repetitive description will be omitted.

Figure 3:
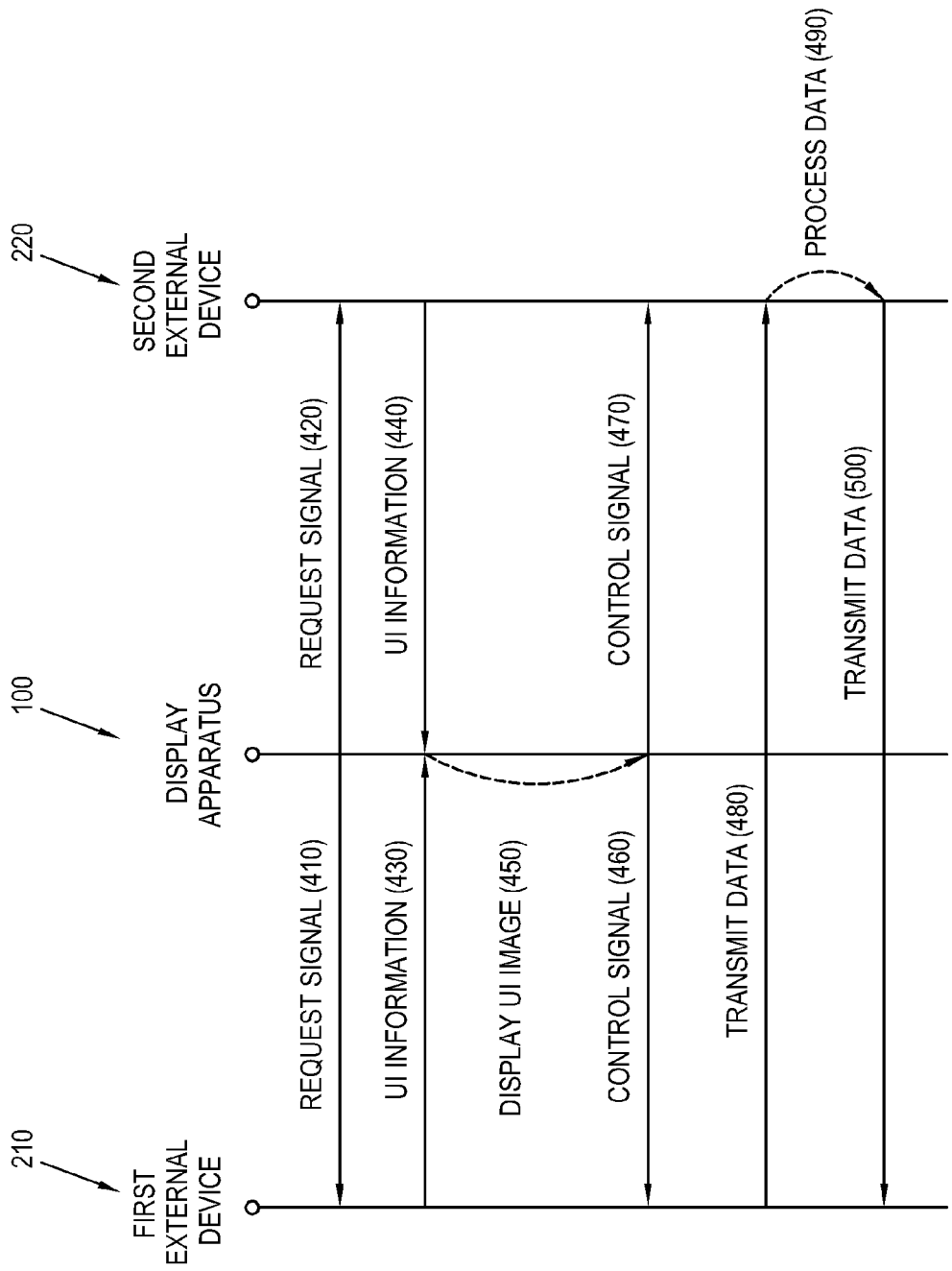
FIG. 3 illustrates an example of transmission of signals and data between the display apparatus and the first and second external devices according to an exemplary embodiment.

Hereinafter, transmission of signals and data in the system according to an exemplary embodiment will be described with reference to FIG. 3. FIG. 3 illustrates transmission and reception of signals, data, commands, and/or information among the first external device 210, the second external device 220 and the display apparatus 100.

As shown therein, the display apparatus 100 transmits to the first and second external devices 210 and 220, signals requesting the relevant information to display a UI image (operations 410 and 420). In response to the request signals, the first and second external devices 210 and 220 transmit UI information to the display apparatus 100, respectively (operations 430 and 440).

Based on the received UI information, the display apparatus 100 displays a UI image (operation 450). The display apparatus 100 may receive an input to process predetermined data of the first external device 210 by the application of the second external device 220 through the displayed UI image.

Upon receiving the input, the display apparatus 100 transmits a control signal to the first external device 210 to transmit the concerned data to the second external device 220 (operation 460), and transmits a control signal to the second external device 220 to process the data transmitted by the first external device 210 (operation 470).

According to the control signal received in operation 460, the first external device 210 transmits the data to the second external device 220 (operation 480).

In operation 470, the second external device 220 processes the data transmitted by the first external device 210 by the application according to the control signal received in operation 470. If this control signal includes information regarding storage of the processed data in the first external device 210, the second external device 220 may transmit the processed data to the first external device 210 such that the data is stored in the first external device 210 (operation 500).

According to the transmission and reception processes for signals and data, the display apparatus 100 according to the present exemplary embodiment may relay interaction between the first and second external devices 210 and 220. That is, the display apparatus may serve as an intermediary between the first and second external devices 210 and 220.

Regarding processing of the data of the first external device 210 through the application, the display apparatus 100 may have the application of the second external device 220 executed in the display apparatus 100 and may allow the data to be processed by the application executed in the display apparatus 100.

For example, the display apparatus 100 may provide system resources necessary for the execution of the application installed in the second external device 220 to thereby execute the application of the second external device 220 in the display apparatus 100.

Figure 4:
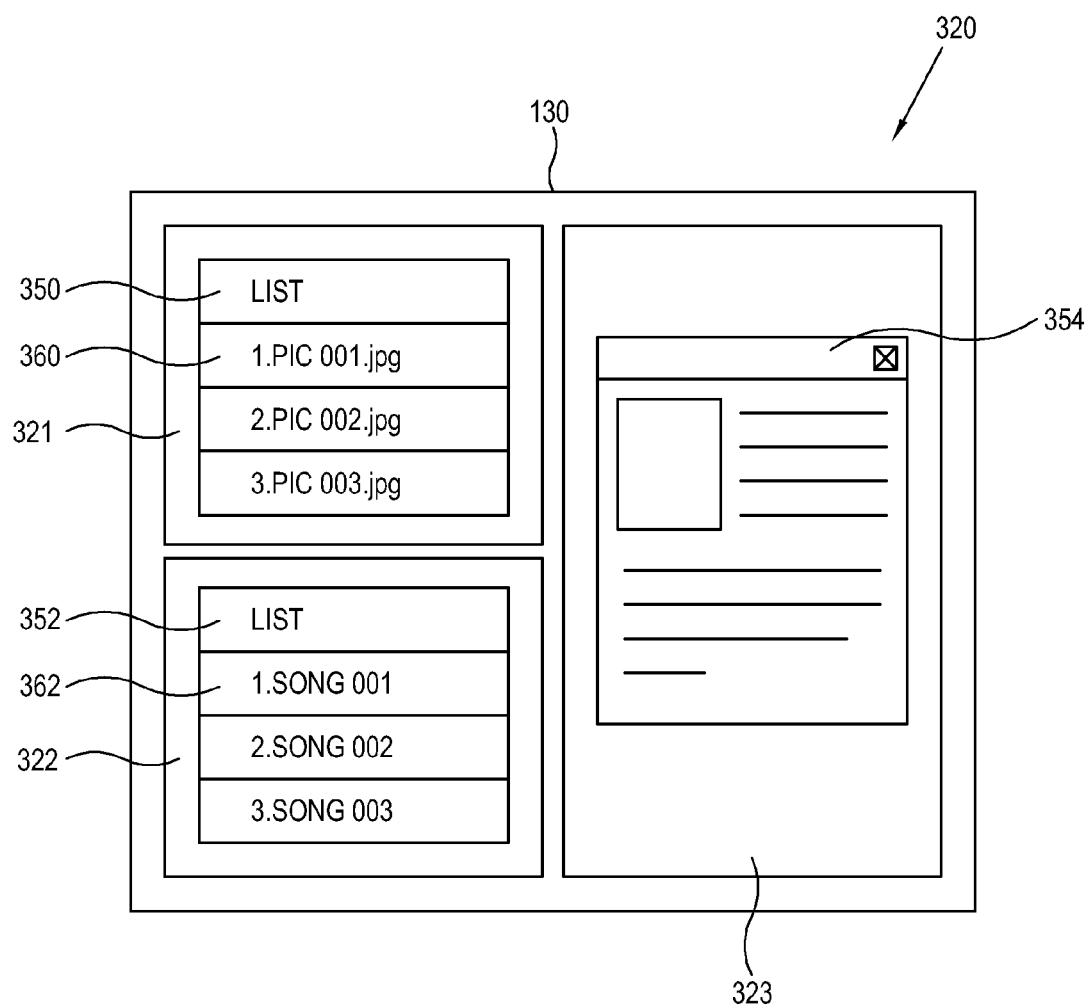
FIG. 4 illustrates an example of a UI image corresponding to first and second external devices which are displayed in a display apparatus according to another exemplary embodiment.

For example, predetermined content data which are stored in the first external device 210 or the second external device 220 may be collected and processed by the application installed in the display apparatus 100. This will be described with reference to FIG. 4. FIG. 4 illustrates an example of a UI image 320 corresponding to the first and second external devices 210 and 220 displayed in the display apparatus 100 according to an exemplary embodiment.

The configuration of the display apparatus 100 according to the present exemplary embodiment may be similar or equivalent to the one described above. Thus, repetitive description will be omitted. In the present exemplary embodiment, an image data file stored in the first external device 210 and a music data file stored in the second external device 220 are edited and processed together to generate an album file. However, this is an example, which is not limiting.

As shown in FIG. 4, the controller 140 displays the UI image 320 on the display device 130 corresponding to the first external device 210, the second external device 220 and the display apparatus 100. The UI image 320 includes a first UI image 321 corresponding to the first external device 210, a second UI image 322 corresponding to the second external device 220 and a third UI image 323 corresponding to UI environment provided by the display apparatus 100 itself.

The controller 140 accesses the first and second external devices 210 and 220 and receives information on an image data file list 350 stored in the first external device 210 and information on a music data file list 352 stored in the second external device 220. The controller 140 displays the first UI image 321 including the image data file list 350 of the first external device 210 and the second UI image 322 including the music data file list 352 of the second external device 220, based on the received information.

Together with the first and second UI images 321 and 322, the controller 140 displays a third UI image 323 including an execution view 354 of the application installed in an operating system driven by the display apparatus 100.

The first UI image 321, the second UI image 322 and the third UI image 323 may interact with one another by dragging and dropping objects included in the UI image 320. For example, if a user drags and drops a predetermined image data file 360 of the first UI image 321 and a predetermined music data file 362 of the second UI image 322 to the third UI image 323, the controller 140 receives the image data file and the music data file from the first and second external devices 210 and 220, respectively, edits the received files by the application and generates a new album file.

According to a user's input through the display device 130, the controller 140 may store the generated album file in the display apparatus 100 or transmit to and store the album file in the first external device 210 or the second external device 220.

Figure 5:
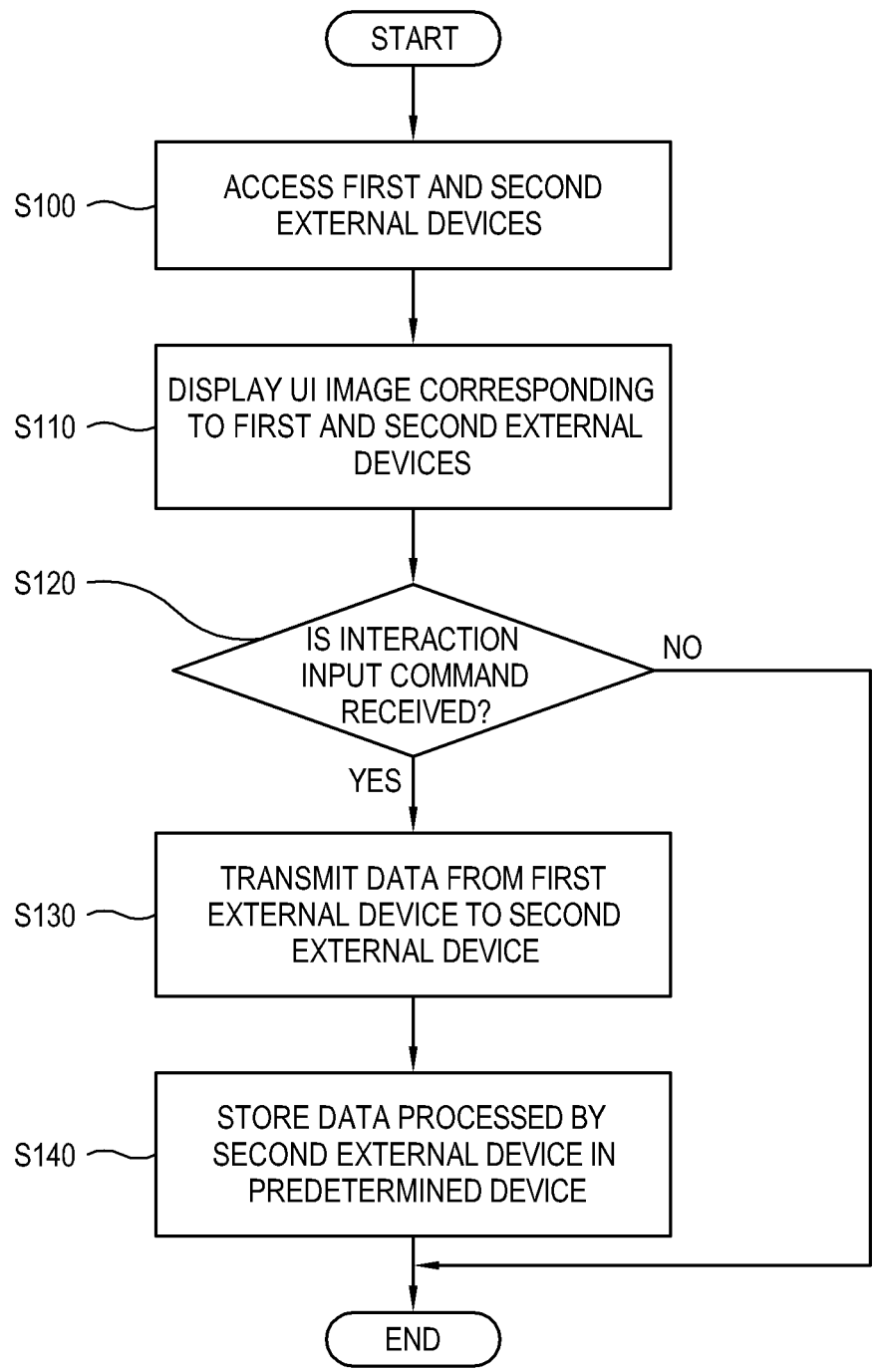
FIG. 5 is a control flowchart of a control method of the display apparatus according to an exemplary embodiment.

Hereinafter, a control method of the display apparatus 100 according to the an exemplary embodiment will be described with reference to FIG. 5. FIG. 5 is a control flowchart of the control method of the display apparatus 100.

As shown therein, the display apparatus 100 accesses the first external device 210 storing data therein and the second external device 220 storing therein an application to process the data (S100). The display apparatus 100 displays a UI image corresponding to the data of the first external device 210 and the application of the second external device 220 (S110).

Upon receiving an interaction input command, e.g., a command for processing the data by the application through the UI image (S120), the display apparatus 100 controls the first external device 210 to transmit the data to the second external device 220 to process the data (S130). Otherwise, the display apparatus 100 may perform at least a part of the processing operation when the application of the second external device 220 processes the data.

The display apparatus 100 stores the processed data in a storage (S140).

In the foregoing exemplary embodiments, the interaction input between the UI images is performed by a user touching the display device 130 as a touch screen. In the case of a display apparatus in which the display device 130 does not include a touch screen, such interaction input may be performed by a user's input through a user input device (not shown) provided additionally.

Although a few exemplary embodiments have been shown and described, it will be appreciated by those skilled in the art that changes may be made in these exemplary embodiments without departing from the principles and spirit of the invention, the range of which is defined in the appended claims and their equivalents.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display device;
   a communication unit configured to communicate with a plurality of devices comprising a first device and a second device, the first device and the second device being devices external to the display device; and
   a hardware processor configured:
      to control the display device to display a first user interface (UI) image including a list of content files stored in the first device and a second UI image including an execution view of an application for editing the content files, the application being stored and executed in the second device,
      in response to receiving a first user input selecting at least one of the content files through the first UI image, to control the first device to transmit the selected content file to the second device,
      in response to receiving a second user input to manipulate a processing operation of the application through the second UI image, to control the communication unit to transmit a first control signal to the second device such that the application edits the selected content file based on the first control signal, and
      in response to receiving a third user input designating at least one of the plurality of devices, to control the communication unit to transmit a second control signal to the second device such that the second device transmits the edited content file to a designated device.

2. The display apparatus according to claim 1, wherein the first UI image and the second UI image correspond to UI images provided by the first device and the second device, respectively.

3. The display apparatus according to claim 1, wherein the hardware processor is configured to control in response to the selected content file being selected, dragged, and dropped to the execution view of the application.

4. The display apparatus according to claim 1, wherein the display device comprises a touch screen, and
   the first user input and the second user input comprise a touch, drag, and drop of the selected content file through the touch screen.

5. The display apparatus according to claim 1, wherein the hardware processor receives the second UI image corresponding to the execution view of the application of the second device, and
   receives the first UI image from the first device to process the content files by the application executed by the second device.

6. The display apparatus according to claim 1, further comprising a user input device,
   wherein the hardware processor is further configured to receive the first user input, the second user input, and the third user input that are input through the user input device.

7. The display apparatus according to claim 1, wherein the hardware processor designates at least one among the first device, the second device, and the display apparatus, to store the selected content file processed by the application.

8. The display apparatus according to claim 1, wherein the list of the content files comprises at least one among a first list of image files and a second list of music files, and
   the second UI image comprises the execution view of the application including an application for editing at least one among the image files and the music files.

9. The display apparatus according to claim 8, wherein the list of the content files comprises the first list of image files and the second list of music files,
the first list of image files is displayed on a first side area of a screen of the display device,
the second list of music files is displayed on a second side area of the screen, the second side area being separate and different from the first side area, and
the execution view of the application is displayed on a third side area of the screen, the third side area being separate and different from the first side area and the second side area.

10. A control method of a display apparatus, the control method comprising:
communicating with a plurality of devices comprising a first device that stores content data and a second device that stores an application to process the content data, the first device and the second device being devices external to the display apparatus;
displaying a first user interface (UI) image corresponding to the first device and a second UI image corresponding to the second device;
receiving a command to process the content data by the application through the first UI image and the second UI image; and
controlling a processing operation of the application with respect to the content data based on the command,
wherein the first UI image displays a list of content files stored in the first device,
the second UI image displays an execution view of the application for editing the content files, and
the controlling the processing operation comprises:
in response to receiving a first user input selecting at least one of the content files through the first UI image, controlling the first device to transmit the selected content file to the second device,
in response to receiving a second user input to manipulate the processing operation of the application through the second UI image, controlling to transmit a first control signal to the second device such that the application edits the selected content file based on the first control signal, and
in response to receiving a third user input designating at least one of the plurality of devices, controlling to transmit a second control signal to the second device such that the second device transmits the edited content file to a designated device.

11. The control method according to claim 10, wherein the first UI image and the second UI image correspond to UI images provided by the first device and the second device, respectively.

12. The control method according to claim 10, wherein the receiving the first user input and the second user input comprises:
receiving the first user input and the second user input by selecting, dragging and dropping the selected content file into the execution view of the application.

13. The control method according to claim 10, wherein the display apparatus comprises a touch screen, and
the receiving the first user input and the second user input comprises a touch, drag, and drop of the selected content file through the touch screen.

14. The control method according to claim 10, wherein the displaying comprises receiving the first UI image corresponding to the content data from the first device and receiving the second UI image corresponding to the execution view of the application of the second device.

15. The control method according to claim 10, wherein the controlling the processing operation further comprises storing the content data processed by the application in at least one among the first device, the second device, and the display apparatus.

16. An apparatus comprising:
a communication interface configured to communicate with a plurality of devices comprising a first external device and a second external device;
a hardware processor being configured to obtain data for generating a first user interface (UI) image including a list of content files stored in the first external device and a second UI image including an execution view of an application for editing the content files, the application being stored and executed in the second external device; and
a display device which is configured to display the first UI image and the second UI image,
wherein the hardware processor is further configured:
in response to receiving a first user input selecting at least one of the content files through the first UI image, to control the first external device to transmit the selected content file to the second external device,
in response to receiving a second user input to manipulate a processing operation of the application through the second UI image, to control the communication interface to transmit a first control signal to the second external device such that the application edits the selected content file based on the first control signal, and
in response to receiving a third user input designating at least one of the plurality of devices, to control the communication interface to transmit a second control signal to the second external device such that the second external device transmits the edited content file to a designated device.

17. The apparatus according to claim 16, wherein the list of the content files comprises a list of image files, and
the application comprises image editing application.

18. The apparatus according to claim 16, wherein the first user input and the second user input comprise a touch, drag, and drop of the selected content file by which the selected content file is selected in the first UI image and dropped, by a dragging operation, into the second UI image.

* * * * *